(No Model.)
S. FULLER.
WHEEL HOE.
No. 298,296. Patented May 6, 1884.
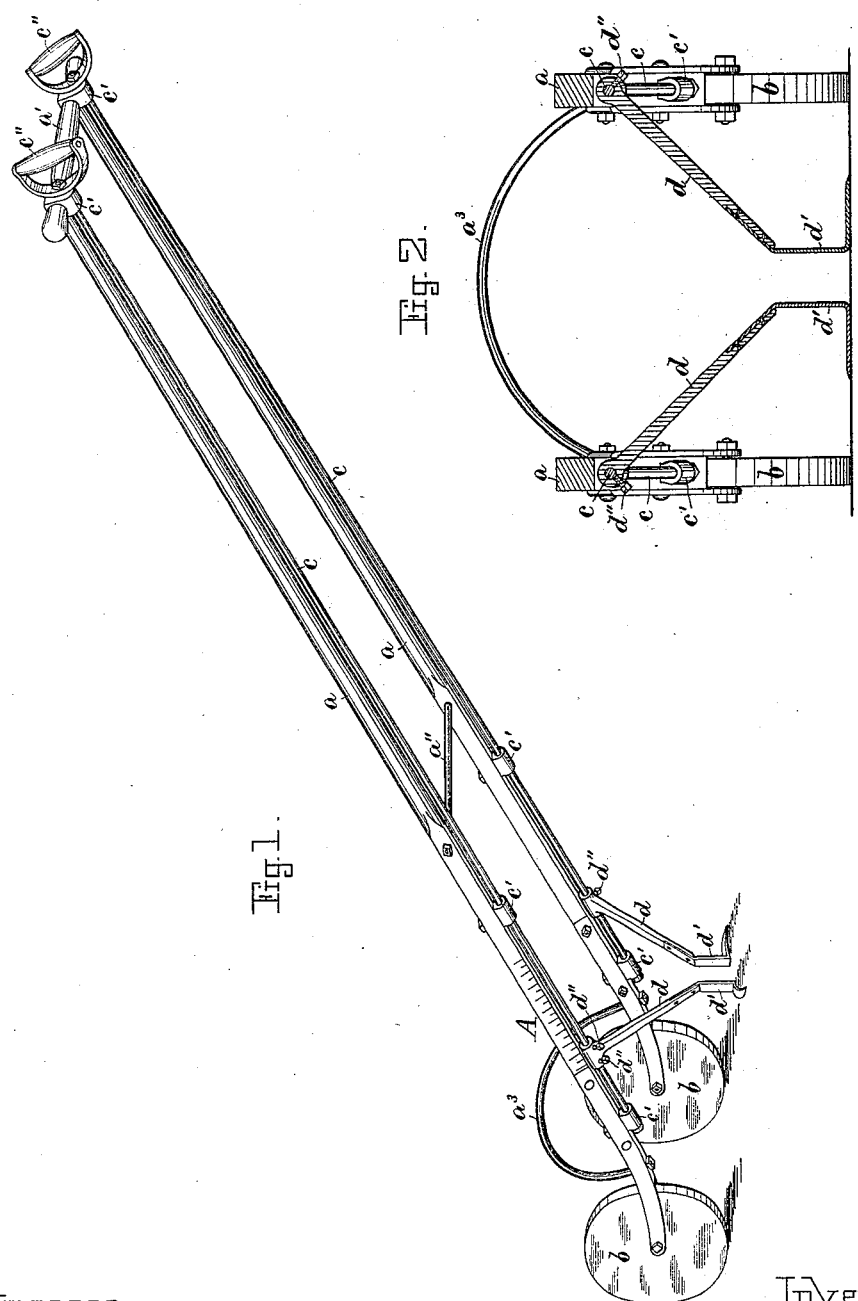
Witnesses
Henry Chadbourn.
John H. Foster.
Inventor
Solomon Fuller.
by Alban Andrén, his atty

UNITED STATES PATENT OFFICE.

SOLOMON FULLER, OF DANVERS, MASSACHUSETTS.

WHEEL-HOE.

SPECIFICATION forming part of Letters Patent No. 298,296, dated May 6, 1884.

Application filed November 5, 1883. (No model.)

*To all whom it may concern:*

Be it known that I, SOLOMON FULLER, a citizen of the United States, residing at Danvers, in the county of Essex and State of Massachusetts, have invented certain new and useful Improvements in Wheel-Hoes; and I do hereby declare that the same are fully described in the following specification and illustrated in the accompanying drawings.

This invention has for its object to provide a machine for cultivating vegetables and plants, in which a pair of weeders or hoes are under control of the operator, and can be independently or simultaneously adjusted in a direction at right angles to the line of travel while the machine is traversing the ground. This I accomplish in the manner and by the means hereinafter described and claimed, reference being had to the accompanying drawings, in which—

Figure 1 represents a perspective view of the improved wheel-hoe, and Fig. 2 represents a lateral cross-section of it over the weeders.

Similar letters refer to similar parts wherever they occur on the different parts of the drawings.

The invention consists of a pair of bars, $a\ a$, that constitute the frame of the machine, such bars being provided with a cross bar or stay, $a'$, in their upper ends, one or more stays or braces, $a''$, between said bars $a\ a$, and with an arched brace, $a^3$, near their lower ends, to permit the apparatus to straddle the plants while in use. To the front ends of the bars $a\ a$ are the wheels $b\ b$, journaled in the usual manner of making wheel-hoes. The bars $a\ a$ have each attached to them suitable bearings, $c'\ c'\ c'$, in which are located the respective rods $c\ c$, in such a manner that they may be rocked in their respective axes in said bearings, but prevented from a longitudinal motion in said bearings. To the upper end of each rod $c$ is attached a suitable handle, $c''$, by means of which the machine can be guided as well as the rods $c$ rocked in their bearings. To a place on each rod $c$, near its lower end, is secured, by means of suitable set-screws, $d''$, or equivalent means, the weeder-bar $d$, that has secured to or made in one piece with its lower end a bent or curved or otherwise shaped weeder, $d'$, as shown in Figs. 1 and 2. The weeders $d\ d'$ may be adjusted up and down on the rods $c\ c$ to suit the size of the operator, and after being so adjusted the said weeders are firmly secured to rods $c\ c$ by means of set-screws $d''\ d''$, as shown.

In practice I prefer to mark on the bars $a\ a$ a suitable scale, A, as shown in Fig. 1, to equalize the position of the weeders while being adjusted.

By taking hold of the handles $c''\ c''$ it will be seen that the operator has a positive control of the lateral adjustment of the weeders $d\ d'$ as the machine is pushed forward, and consequently he can instantly bring said weeders closer together or farther apart, according to the size of the plants that are being weeded, or according to the presence of hard lumps, stones, or other obstructions that may lie in close proximity to the plants; and as each weeder is positively adjustable laterally and independently of its fellows, it will be seen that the weeders are at all times under a positive control of the operator when the machine is pushed forward with a wheel, $b$, on each side of the row of plants, and this is a great advantage over wheel-hoes having stationary weeders, or weeders made yielding by means of springs, as the operator has no control of said weeders in a lateral direction, and is consequently not able to weed as close as may be required, and has to leave a part of the weeding to be done by hand, entailing a great loss of valuable time.

My invention is very simple and durable in its construction, easy of operation, and by its use the proper weeding of the plants is at all times under a positive control of the operator, as above described.

I wish to state that I do not claim any particular shape or construction of the frame $a\ a$, its wheels $b\ b$, braces $a'\ a''\ a^3$, or handles $c''$, as these may be varied and shaped in different ways to suit farmers and the trade; but What I wish to secure by Letters Patent, and claim, is—

1. The combination of the wheeled frame, the independent rocking rods mounted in bearings on the frame, and the weeders or hoes secured to the rods, said rods having means whereby they can be independently or simultaneously rocked in their bearings to adjust the hoes laterally while traversing the ground, substantially as described.

2. The combination of the wheeled frame, the independent rocking-rods mounted in bearings on the frame and provided with handles at their ends, and the weeders or hoes secured to the rods, said handles serving to propel the wheeled frame and to independently or simultaneously rock the rods to adjust the weeders or hoes laterally while traversing the ground, substantially as described.

In testimony whereof I have affixed my signature in presence of two witnesses.

SOLOMON FULLER.

Witnesses:
ALBAN ANDRÉN,
E. J. TORREY.